（12）United States Patent
Takezawa et al.

(10) Patent No.: US 12,247,702 B2
(45) Date of Patent: *Mar. 11, 2025

(54) SAFETY JOINT HOUSING DEVICE

(71) Applicant: TATSUNO CORPORATION, Tokyo (JP)

(72) Inventors: Masahiro Takezawa, Tokyo (JP); Yoshitaka Tsugumi, Tokyo (JP); Yoshimi Oto, Tokyo (JP); Toshihiko Ouchi, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 18/200,927

(22) Filed: May 23, 2023

(65) Prior Publication Data
US 2023/0383912 A1 Nov. 30, 2023

(30) Foreign Application Priority Data

May 31, 2022 (JP) .................................. 2022-088316

(51) Int. Cl.
*F17C 13/12* (2006.01)
*F17C 13/04* (2006.01)

(52) U.S. Cl.
CPC .............. *F17C 13/12* (2013.01); *F17C 13/04* (2013.01); *F17C 2221/012* (2013.01); *F17C 2270/0139* (2013.01)

(58) Field of Classification Search
CPC .... F17C 13/12; F17C 13/04; F17C 2221/012; F17C 2270/0139
See application file for complete search history.

(56) References Cited

U.S. PATENT DOCUMENTS

| | | | |
|---|---|---|---|
| 2,168,951 A | 8/1939 | Taylor | |
| 2020/0384493 A1* | 12/2020 | Takezawa | ................. F17C 5/06 |
| 2021/0362998 A1 | 11/2021 | Stumpf | |
| 2022/0074551 A1 | 3/2022 | Vempaire et al. | |
| 2023/0400158 A1* | 12/2023 | Takezawa | ............... F17C 13/04 |

FOREIGN PATENT DOCUMENTS

| | | |
|---|---|---|
| BE | 554752 | 2/1957 |
| JP | B-6590159 | 10/2019 |

OTHER PUBLICATIONS

European Search Report for EP 23 16 6658; mailed Oct. 13, 2023.

* cited by examiner

Primary Examiner — P. Macade Nichols
(74) Attorney, Agent, or Firm — Stetina Brunda Garred & Brucker

(57) ABSTRACT

To provide a safety joint housing device for preventing a plug or a filling hose from being locked in a lower opening of a casing when the safety joint is separated, thereby preventing a filling device from falling over and being damaged.

4 Claims, 9 Drawing Sheets

SAFETY JOINT HOUSING DEVICE

CROSS-REFERENCE TO RELATED APPLICATIONS

The present application claims priority to Japanese Patent Application No. 2022-088316 filed on May 31, 2022, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a device for housing a safety joint that is used in a filling device for filling gas such as hydrogen gas used as fuel, and has a function of separating the filling device and a filling hose in an emergency.

2. Description of the Related Art

In a vehicle A (for example, a fuel cell vehicle, FCV) that runs on hydrogen as a fuel, as shown in FIG. 10, a hydrogen tank 204 mounted on a vehicle A is filled with hydrogen gas by connecting a filling nozzle 202 provided at a tip of a filling hose 201 and a vehicle side filling port 203 in a hydrogen filling facility. Although it is an extremely rare case, there is a case where the vehicle A starts moving for some reason without an operator's awareness of the hydrogen filling operation. Similarly, although it is an extremely rare case, there is a case where another vehicle collides with the vehicle A, which is being filled with hydrogen, and the vehicle A moves in a state where the operator is not aware of it. If the vehicle A during hydrogen filling starts or moves without the operator's awareness, the filling hose 201 will be pulled, the filling device 200 will overturn and break, and a flammable hydrogen gas will spout out, resulting in a dangerous situation. In order to avoid such a situation, a safety joint 300 for emergency release is provided in a region between the filling device 200 and the filling hose 201, and the safety joint 300 is separated when a tensile load of a predetermined level or over acts on the filling hose 201. Thus, the filling device 200 is prevented from overturning and being damaged. Separation of the safety joint 300 is an extremely rare event and does not occur on a daily basis.

Even if the filling hose 201 is not subjected to a tensile load of a certain level or above, when the filling hose 201 swings, the moment due to the swinging is applied to a filling hose mounting portion of a vehicle-side member (plug) of the safety joint 300. There is a risk that the mounting portion will be damaged and a hydrogen gas will leak from the damaged portion. In response to this, the applicant has proposed a measure to prevent the plug of the safety joint 300 from being damaged by the moment caused by the swinging motion of the filling hose 201 (see JP-B-6590159 gazette).

In FIG. 11, the safety joint 300 described above (indicated only by the dashed lead line in FIG. 11) is built in a casing 320 of the filling device 200. Reference numeral 205 indicates a portion of the casing of the hydrogen filling device. Here, the safety joint 300 includes a plug (a member on the FCV side of the safety joint: not shown in FIG. 11) connected to the filling hose 201, and a socket (not shown in FIG. 11) that is a member on the hydrogen filling device side, and the plug separates from the socket (the safety joint 300 separates) when a tensile load greater than or equal to a predetermined value acts. In the above-described prior art, when the safety joint 300 is separated, the filling hose 201 and the plug coupled thereto pass a hollow portion of a guide member (built into the casing 320 but not shown in FIG. 11) and escape from a lower opening 320A of the casing 320. When the FCV unexpectedly starts or moves, however, the force pulling on the filling hose acts horizontally (laterally) rather than vertically, which may cause the vehicle-side member (plug) to be caught (locked) in the lower opening 320A. Then, when the FCV unexpectedly starts and the safety joint 300 is separated, if the plug locks in the lower opening 320A, the force of the FCV pulling the filling hose 201 will be transmitted to the hydrogen filling device via the locking point between the plug and the lower opening 320A of the casing 320, which may cause the hydrogen filling device to overturn.

In addition, since a spring, an infrared fiber, a mesh, etc. are arranged around an outer periphery of the filling hose 201, and a cover of the filling hose 201 is also present, the filling hose 201 more likely to lock (get caught) with the casing lower opening 320A. That is, in addition to the plug at the tip of the filling hose 201 being locked to the lower opening 320A, there is a possibility that the filling hose 201 will be locked to the casing lower opening 320A. For this reason, even if the safety joint 300 is separated when the FCV unexpectedly starts or moves, the filling hose 201 is locked to the hydrogen filling device, the FCV pulls the filling hose 201 and the hydrogen filling device, and the hydrogen filling device may fall over and be damaged. The conventional technology described above is not intended to deal with such a situation.

The content of JP-B-6590159 gazette is incorporated herein by reference in its entirety.

BRIEF SUMMARY

The present invention has been proposed in view of the above-mentioned problems of the prior art, and the object thereof is to provide a safety joint housing device for preventing the plug of the safety joint or the filling hose from being locked in the lower opening of the casing when the safety joint is separated, thereby preventing the filling device from falling over and being damaged.

A safety joint housing device 100, for housing a safety joint 101 including a plug connected to a filling hose 61 and a socket 20 provided in a filling device, the safety joint separating when a tensile load of a predetermined level or over is applied, according to the present invention is characterized by including: a casing for housing the plug 10 and the socket in a connected state; a front roller 30 disposed on a front side of the casing at a lower opening from which the filling hose 61 is led out from the casing so as to be rotatable about a horizontal axis; and two side rollers 40 adjacent to the front roller 10 and rotatably arranged about horizontal axes orthogonal to the axis of the front roller 10; wherein the filling hose 61 passes through the casing side of a U-shaped portion formed by the front roller 30 and the two side rollers 40.

In the safety joint housing device according to the present invention, within a casing 320 can be a hose guide 70 having a hollow portion through which the filling hose 61 and the associated plug 10 move when the safety joint 101 separates.

Further, in the safety joint housing device according to the present invention, a central shaft 31 of the front roller 30 and central shafts 41 of the side rollers 40 can be connected; a hollow rotating body 32 of the front roller 30 may be arranged rotatably around the central shaft 31 without being connected thereto; and hollow rotating bodies 42 of the side rollers 40 can be arranged rotatably around the central shafts 41 without being connected thereto.

The safety joint housing device may further include a mounting frame 80 having side plates 81 extending parallel to the side rollers 40-1, a front plate 82 extending parallel to the front roller 30-1, and a filling device side plate 83 extending parallel to the front plate 82, wherein a protruding portion 81A protruding toward the front roller 30-1 can be formed on an end portion, on the front roller side, of each side plate 81; a central shaft 31-1 of the front roller 30-1 can be rotatably supported by the protruding portions 81A of the side plates 81; and central shafts 41-1 of the two side rollers 40-1 can be rotatably supported on both longitudinal ends of the front plate 82 and on both longitudinal ends of the filling device side plate 83.

Further, in the safety joint housing device, a non-rotating part 33-2 with a central shaft supporting portion 34-2 may be interposed between an end of the front roller 30-2 and an end of the side roller 40-2 adjacent to the front roller side; another non-rotating part 33-2 with a central shaft supporting portion 34-2 may be interposed between the other end of the front roller 30-2 and an end of the other side roller 40-2 adjacent to the front roller side; the non-rotating parts 33-2 rotatably support the central shafts 31-2 and/or 41-2 of the rollers 30-2 and/or 40-2 on which they 33-2 are provided; and the central shaft supporting portions 34-2 rotatably support the central shafts 31-2 and/or 41-2 of the rollers 30-2 and/or 40-2 on which they 34-2 are provided.

According to the present invention with the above-described construction, since the plug 10 and the socket 20 have the function of separating when a tensile load of a predetermined value or over acts, for example, even if a fuel cell vehicle starts moving during filling operation, the plug 10 and the socket 20 will separate, and a tensile force of the filling hose 61 does not act on a body of the filling device. The front roller 30 and the two side rollers 40 are rotatably arranged at the lower opening of the casing, even if the filling hose 61 or the plug 10 at a tip of the filling hose 61 comes into contact with the rollers 30, 40, it slides on the surfaces of the rollers 30, 40, so that it does not engage with the rollers 30, 40. Alternatively, since the rollers 30, 40 rotate, the filling hose 61 or the plug 10 is prevented from locking with the rollers 30, 40. As a result, the filling hose 61 or the plug 10 at the tip thereof smoothly comes out of the casing due to the tensile force acting on the filling hose 61. According to the present invention, the rotation of the front roller 30 and/or the side rollers 40 prevents the filling hose 61 or the plug 10 from locking (hooking) in the lower opening of the casing, thereby the filling device is prevented from being pulled.

In the present invention, since the rollers 30 and 40 are provided at the opening of the casing, it is possible to prevent the filling device from being pulled by the filling hose 61 of the FCV to be filled with regardless of the relative position of the FCV with respect to the filling device unless the FCV is parked on the back side (the side where the filling hose 61 is not arranged) of the filling device and the filling operation is performed (an abnormal filling operation that is not performed in daily life is performed). Then, if a hose guide 70 having a hollow portion through which the filling hose 61 and the plug 10 connected thereto move when the safety joint 101 is separated, the hose guide 70 restrains the swaying of the filling hose 61. With this, the plug 10 is prevented from being damaged due to the shaking of the filling hose 61 or the like.

In addition, in the present invention, connecting the central shaft 31 of the front roller 30 and the central shafts 41 of the side rollers 40, and arranging the hollow rotating body 32 of the front roller 30 rotatable around the central shaft 31 without being connected thereto and the hollow rotating bodies 42 of the side rollers 40 rotatable around the central shafts 41 without being connected thereto allow (the rotating body 32) of the front roller 30 and (the rotating bodies 42) of the side rollers 40 to be rotatable even though they extend perpendicular to each other.

Alternatively, the safety joint housing device according to the present invention may further include the mounting frame 80 having side plates 81 extending parallel to the side rollers 40-1, the front plate 82 extending parallel to the front roller 30-1, and the filling device side plate 83 extending parallel to the front plate 82, wherein the protruding portion 81A protruding toward the front roller 30-1 can be formed on an end portion, on the front roller side, of each side plate 81; the central shaft 31-1 of the front roller 30-1 can be rotatably supported by the protruding portions 81A of the side plates 81; and the central shafts 41-1 of the two side rollers 40-1 can be rotatably supported on both longitudinal ends of the front plate 82 and on both longitudinal ends of the filling device side plate 83. With this construction, attaching the mounting frame 80 to an inner wall surface of a lower portion of the casing, the front roller 30-1 and the side rollers 40-1, which are adjacent to each other and whose central axes are perpendicular to each other, can be rotatably fixed to the lower opening of the casing.

Further, in the safety joint housing device according to the present invention, the non-rotating part 33-2 with the central shaft supporting portion 34-2 may be interposed between an end of the front roller 30-2 or an end of the side roller 40-2 adjacent to the front roller side; another non-rotating part 33-2 with a central shaft supporting portion 34-2 may be interposed between the other end of the front roller 30-2 or an end of the other side roller 40-2 adjacent to the front roller side; the non-rotating parts 33-2 rotatably support the central shafts 31-2 and/or 41-2 of the rollers 30-2 and/or 40-2 on which they 33-2 are provided; and the central shaft supporting portions 34-2 rotatably support the central shafts 31-2 and/or 41-2 of the rollers 30-2 and/or 40-2 on which they 34-2 are provided. With this construction, since the central shafts 41-2 and/or 31-2 of the adjacent rollers 40-2 and/or 30-2 are rotatably supported by the non-rotating portion 33-2, and the central shafts 31-2 and/or 41-2 of the rollers 30-2 and/or 40-2 are rotatably supported by the central shaft supporting portions 34-2 and/or 40-1, the front roller 30-2 and the side roller 40-2 perpendicular to each other can be rotatably attached to the lower opening of the casing.

DETAILED DESCRIPTION

Figure 1:
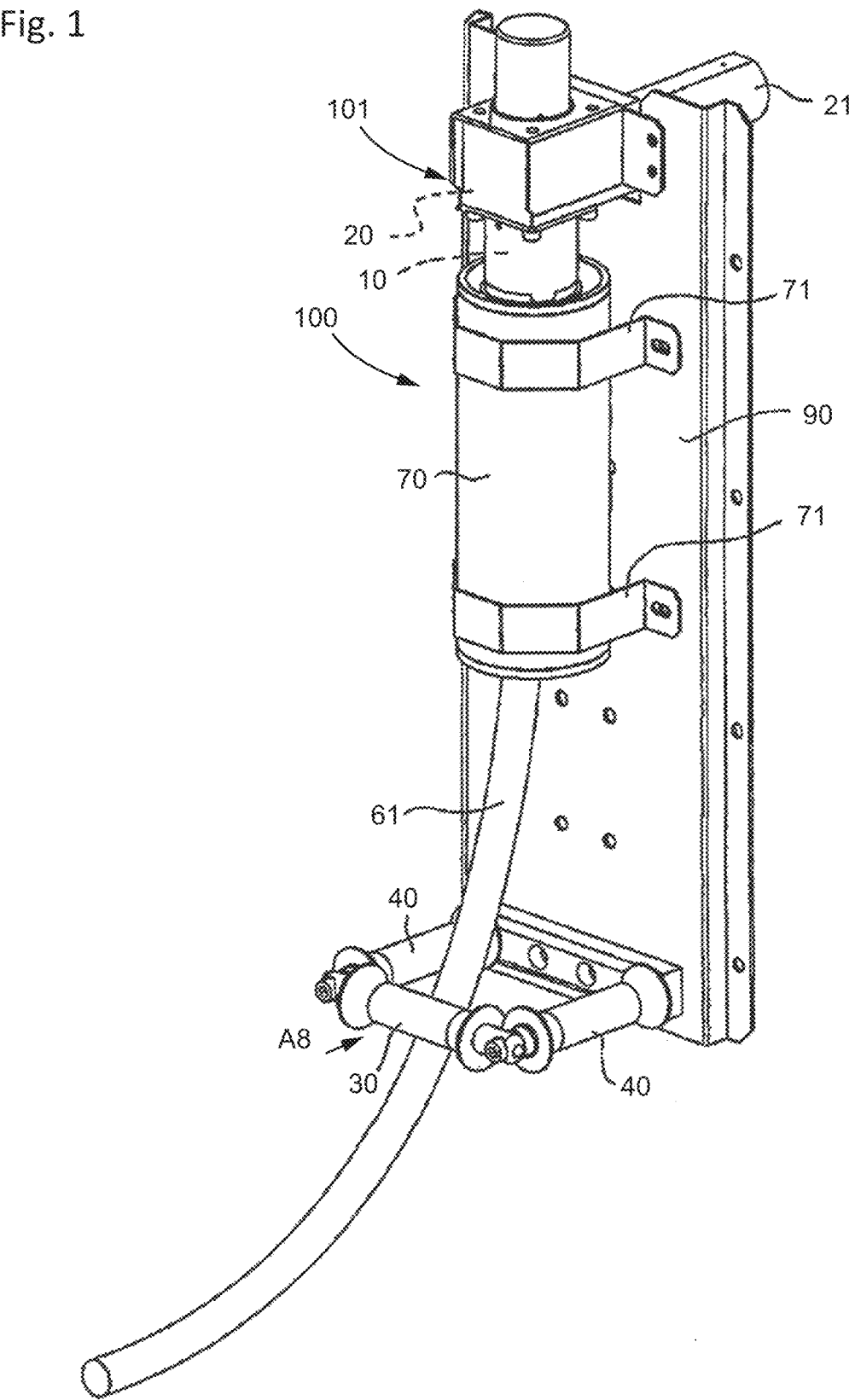
FIG. 1 is an explanatory view showing a safety joint housing device according to the first embodiment of the present invention in which a plug and a socket are not separated from each other.
Figure 2:
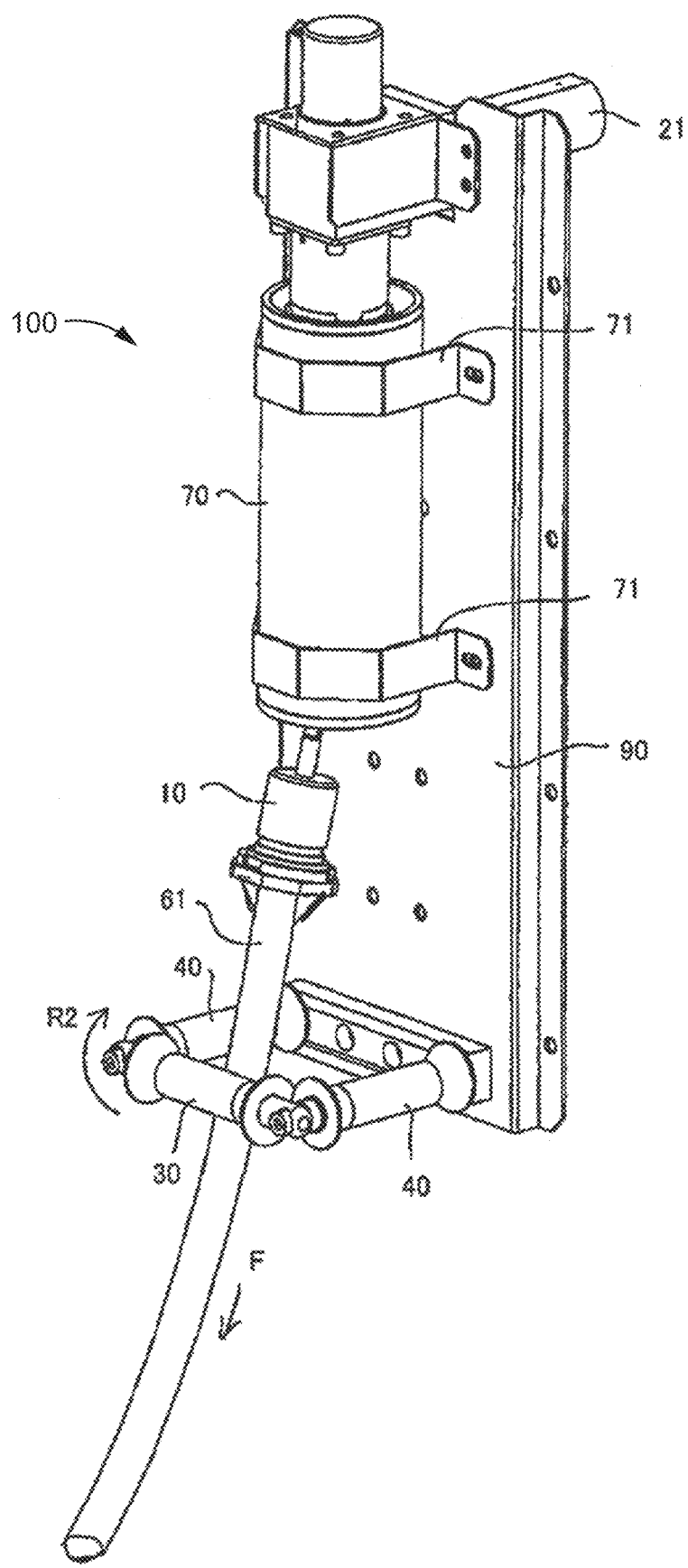
FIG. 2 is a view showing an initial state in which a filling hose is pulled toward a front side of a filling device and a safety joint is separated in the first embodiment.
Figure 3:
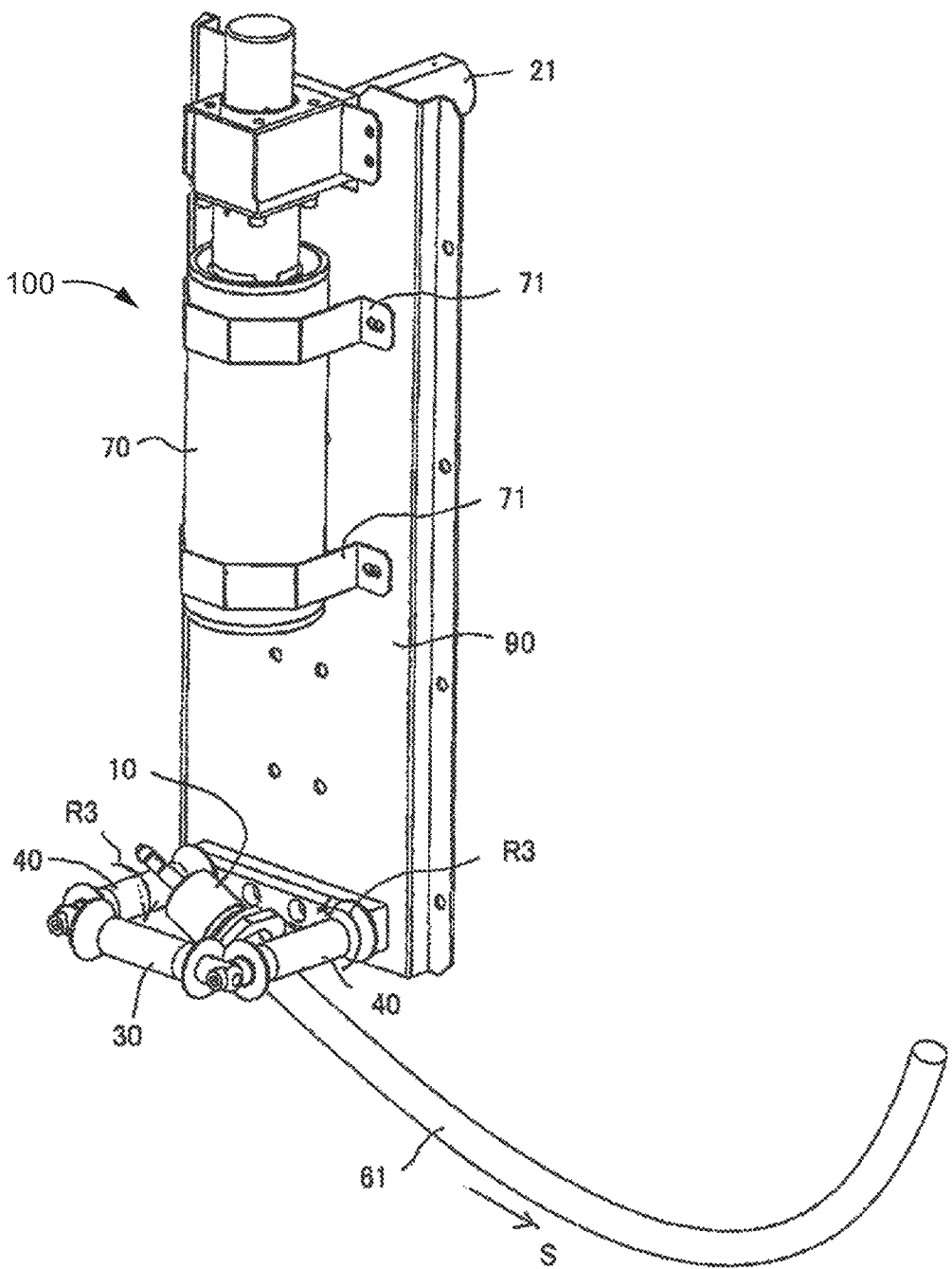
FIG. 3 is a view showing a state in which the filling hose is pulled to a side of the filling device; the safety joint is separated; and the plug is in contact with a roller in the first embodiment.
Figure 11:
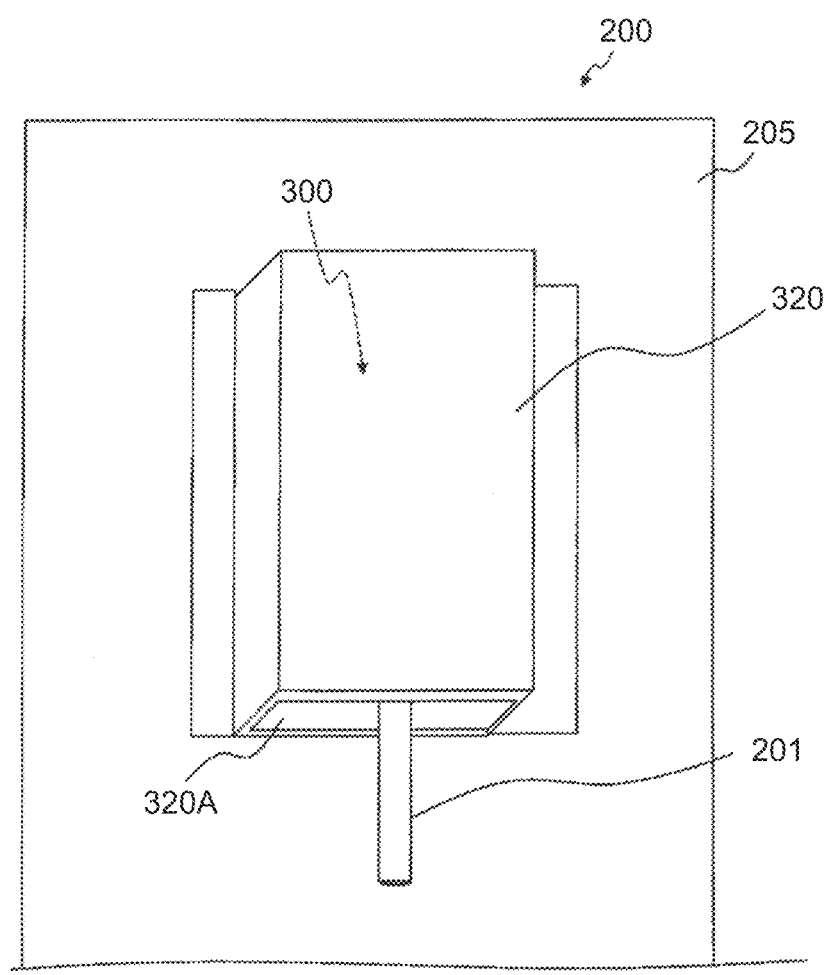
FIG. 11 is an explanatory view showing a state in which the safety joint is attached to a hydrogen filling device.

Hereinafter, embodiments of the present invention will be described with reference to the accompanying drawings. FIGS. 1 to 3 show the first embodiment of the invention. A safety joint housing device according to the first embodiment is generally designated as a reference numeral 100. In FIG. 1, a safety joint 101 composed of a plug 10 (a vehicle-side member of the safety joint 101) and a socket 20 (a filling device-side member of the safety joint 101), and a hollow hose guide 70 of the safety joint housing device 100 are shown. A casing is not shown in FIGS. 1 to 3, but is shown in FIG. 11. In FIG. 1, a lead line of the plug 10 coupled to the socket 20 is shown as a dashed line because the plug 10 is covered by a plug accommodating portion of the socket 20 and is not exposed in FIG. 1. On the other hand, in FIGS. 2 and 3, the plug 10 separated from the socket 20 is exposed, and is indicated by a solid lead line. In FIG. 1, the hose guide 70 is a hollow cylindrical member and has a cylindrical hollow portion. The plug 10 and a filling hose 61 separated from the socket 20 move through the hollow portion in the hose guide 70.

Figure 10:
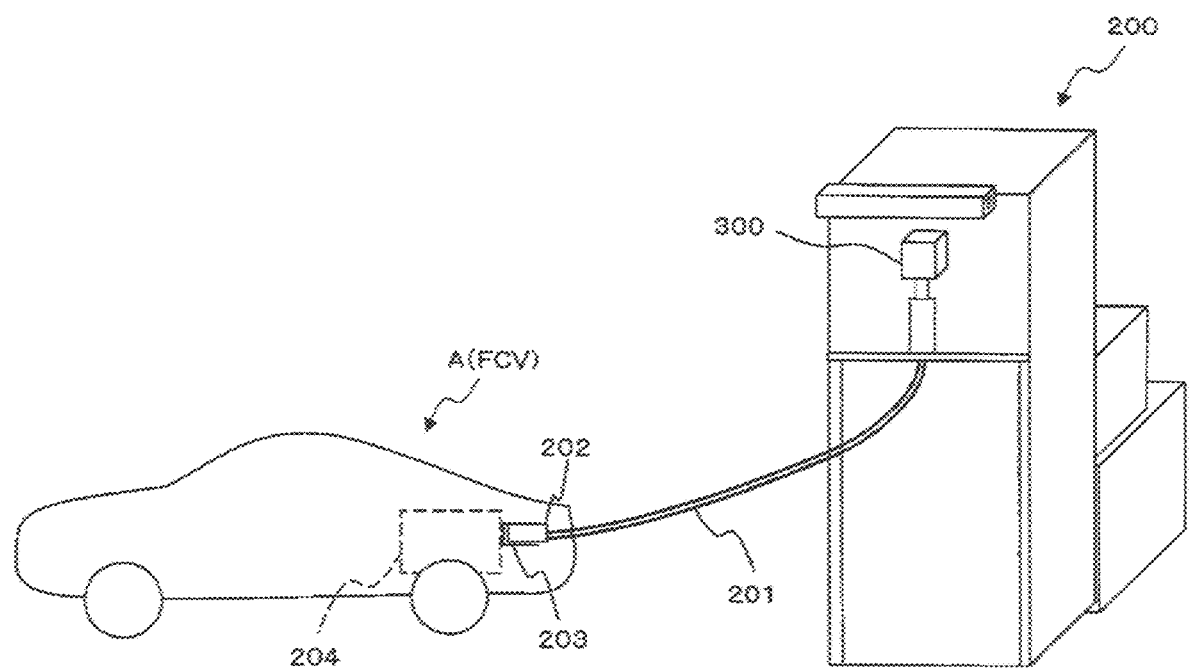
FIG. 10 is an explanatory view showing an outline of a hydrogen filling facility.

In FIGS. 1 to 3, a base 90 is provided for attaching the safety joint 101 consisting of the plug 10 and the socket 20 together with a casing 320 (shown in FIG. 11) to a filling device 200 (shown in FIGS. 10 and 11). In FIGS. 1 to 3, the hose guide 70 is fixed to the base via a mounting member 71. Although not shown in FIGS. 1 to 3, the safety joint housing device 100 has the casing 320 (shown in FIG. 11) in which the plug 10, the socket 20 and the hose guide 70 are housed. In order to prevent illustration from being complicated, in FIGS. 1 to 8, illustration of a casing body (a rectangular casing body, excluding the filling device 200 side) in the safety joint housing device is omitted. Three rotatably supported rollers (a front roller 30 and two side rollers 40) are arranged in a lower opening of the casing 320 (in FIG. 11). The space enclosed by the three rollers 30, 40 and the base 90 constitutes the lower opening of the casing 320 (not shown in FIGS. 1 to 3).

In FIG. 1, the safety joint 101 has a function of separating the plug 10 from the socket 20 (the safety joint 101 separates) when a tensile load of a predetermined value or more acts on the filling hose 61. When the safety joint 101 separates, the filling hose 61 and the plug 10 move through the hollow portion of the guide member 70 and exit through the lower opening of the casing. The guide member 70 limits the movable range of the filling hose 61 to within the cross-sectional area of the guide member 70, and the pivoting of the filling hose 61 to protect the plug 10 and also regulates the angle of the filling hose 61 pulled by the FCV with respect to the vertical to allow the safety coupling 300 to separate at the prescribed tensile load. Hydrogen gas is supplied from a filling device (not shown in FIGS. 1 to 3) to the socket through a gas pipe 21, and then passes through the plug 10 and the filling hose 61 to a filling nozzle (reference numeral 202 in FIG. 10) in a tank of an FCV. As described above, the front roller 30 and the two side rollers 40 are rotatably arranged in the lower opening of the casing 320. The front roller 30 and the two side rollers 40 adjacent to the front roller 30 are each rotatable. A support structure of the adjacent rollers 30, 40 will be described later with reference to FIGS. 4 to 6.

In the state shown in FIG. 1, the plug 10 and socket 20 are coupled and not separated. A state in which the plug 10 is separated from the socket 20 is shown in FIGS. 2 and 3. When the plug 10 separates from the socket 20, the plug 10 or the filling hose 61 contacts the front roller 30 or the side roller 40, causing the front roller 30 or the side roller 40 to rotate. FIG. 2 shows a case where the filling hose 61 is pulled toward the front side of the filling device (the side of the arrow F in FIG. 2), and shows an initial stage in which the plug 10 has fallen out of the socket 20. In the state shown in FIG. 2, the filling hose 61 is in contact with the front roller 30, the plug 10 has just exited the hose guide 70 and is not in contact with the rollers 30, FIG. 3 shows a state in which a tensile force of the filling hose 61 acts on a side of the filling device (in a direction of the arrow S), and the plug 10 coming out of the hose guide 70 is in contact with the side roller 40.

As shown in FIG. 2, when the plug 10 or the filling hose 61 contacts the front roller the front roller 30 rotates in the direction of the arrow R2 so that the plug 10 or the filling hose 61 is not engaged with (got stuck on) an edge of the casing opening or the rollers 30 and and the tensile force acting on the filling hose 61 separates it from the filling device and moves in the direction of the arrow F, which is the front direction of the filling device. Even if the plug 10 engages with the front roller 30, the rotation of the front roller 30 causes the plug 10 to come off the front roller 30 and move in the direction in which the filling hose 61 is pulled (in the direction of the arrow F). Alternatively, when the plug 10 or the filling hose 61 contacts the rollers 30, 40, it slides on smooth surfaces of the rollers 30, 40 and is not locked on the rollers 30, 40. On the other hand, in the state shown in FIG. 3, even if the side roller 40 comes into contact with the plug 10 or the filling hose 61, the side roller 40 rotates in the direction of the arrow R3, which allows the plug 10 or the filling hose 61 to move in a pulled direction (the direction of the arrow S) without being locked on the side roller 40.

In this way, even if the filling hose 61 or the plug 10 contacts the front roller 30 or the side rollers 40, the front roller 30 or the side rollers 40 rotate and do not engage (get caught) with the filling hose 61 or the plug 10. The plug 10 and the filling hose 61 therefore smoothly come out of the casing and move easily in the direction in which the tensile force acts, so that the filling device 200 is not overturned and damaged.

It is also conceivable to make the cross-sectional area of the opening of the casing 320 (shown in FIG. 11) is not provided with the front roller 30 and the side rollers 40, and the cross-sectional area of the opening is increased so that the filling hose 61 or the plug 10 does not get caught in the lower opening. There is a desire, however, to make the casing 320 (FIG. 11) basically smaller. If the casing is too large, the angle of the filling hose 61 pulled by the vehicle A will be large with respect to the casing central shaft (vertical axis). This increases the horizontal force acting on the safety joint 300 (FIG. 10) and may prevent the plug from separating from the socket under a given tensile load. It is desirable therefore that the casing be as small as possible, and the lower opening of the casing cannot be enlarged.

Here, even if the opening of the casing 320 (FIG. 11) is smoothly rounded, it is not possible to sufficiently prevent the filling hose 61 (FIGS. 1 to 3) from being caught in the opening of the casing. As described above, the filling hose 201 (FIG. 11) is provided with a spring, an infrared fiber, a mesh, etc. on its outer periphery, so that the surface of the filling hose 61 is uneven. In addition, since the plate forming the casing is thin, the curvature cannot be reduced. Unless the opening of the casing moves relatively due to the tensile force acting on the filling hose 61, the filling hose 61 will consequently lock at the opening of the casing. Even if the opening is rounded, it is not possible to effectively prevent the plug or filling hose 61 from being locked in the casing opening.

Figure 4:
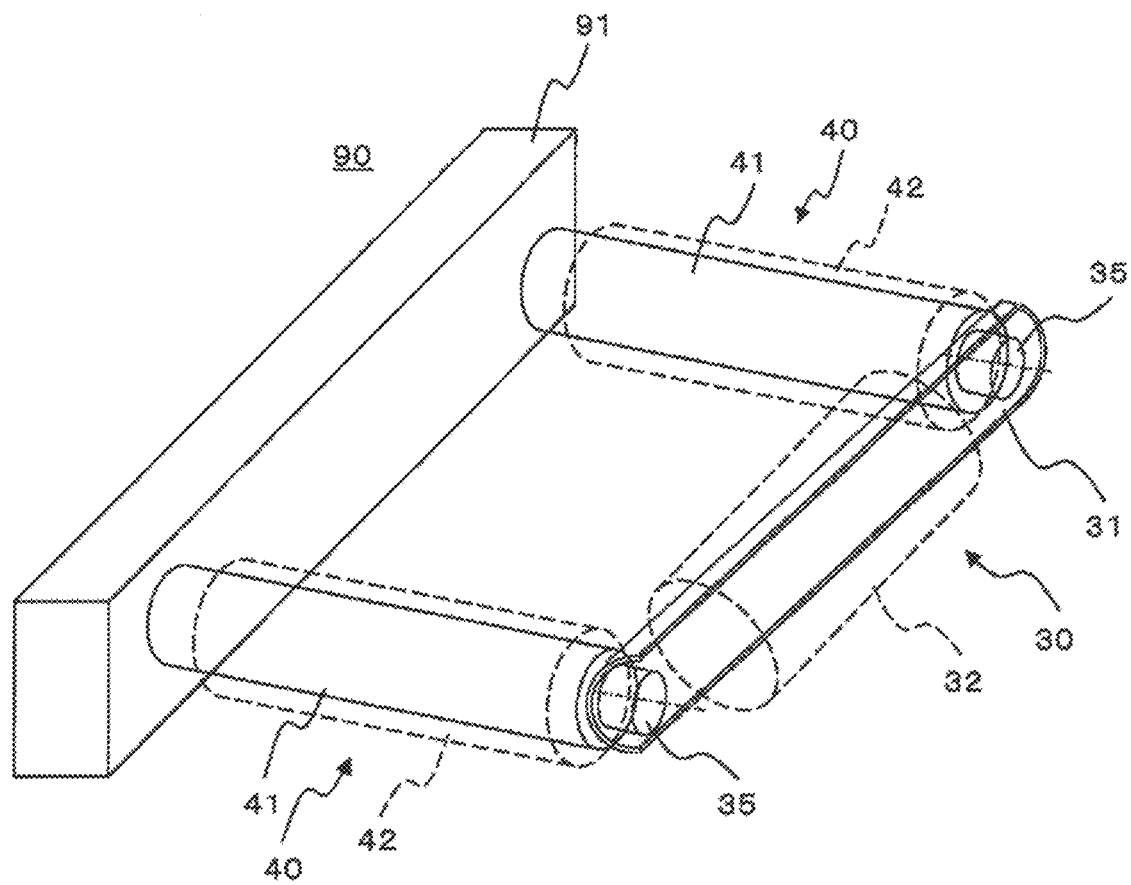
FIG. 4 is a partial cross section explanatory drawing showing a roller support structure in the first embodiment.
Figure 5:
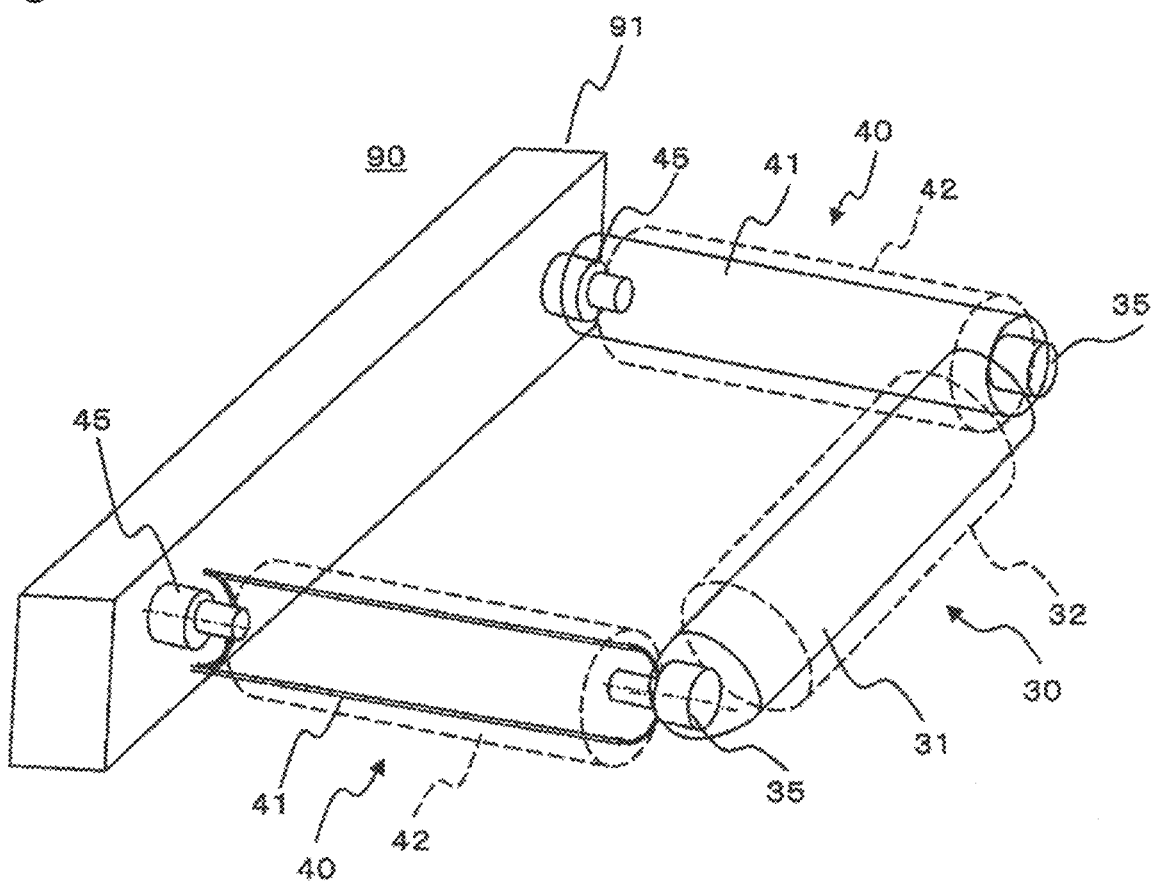
FIG. 5 is a explanatory view showing the roller support structure, similar to FIG. 4, and is a partial cross-sectional explanatory view showing a section different from that of FIG. 4.
Figure 6:
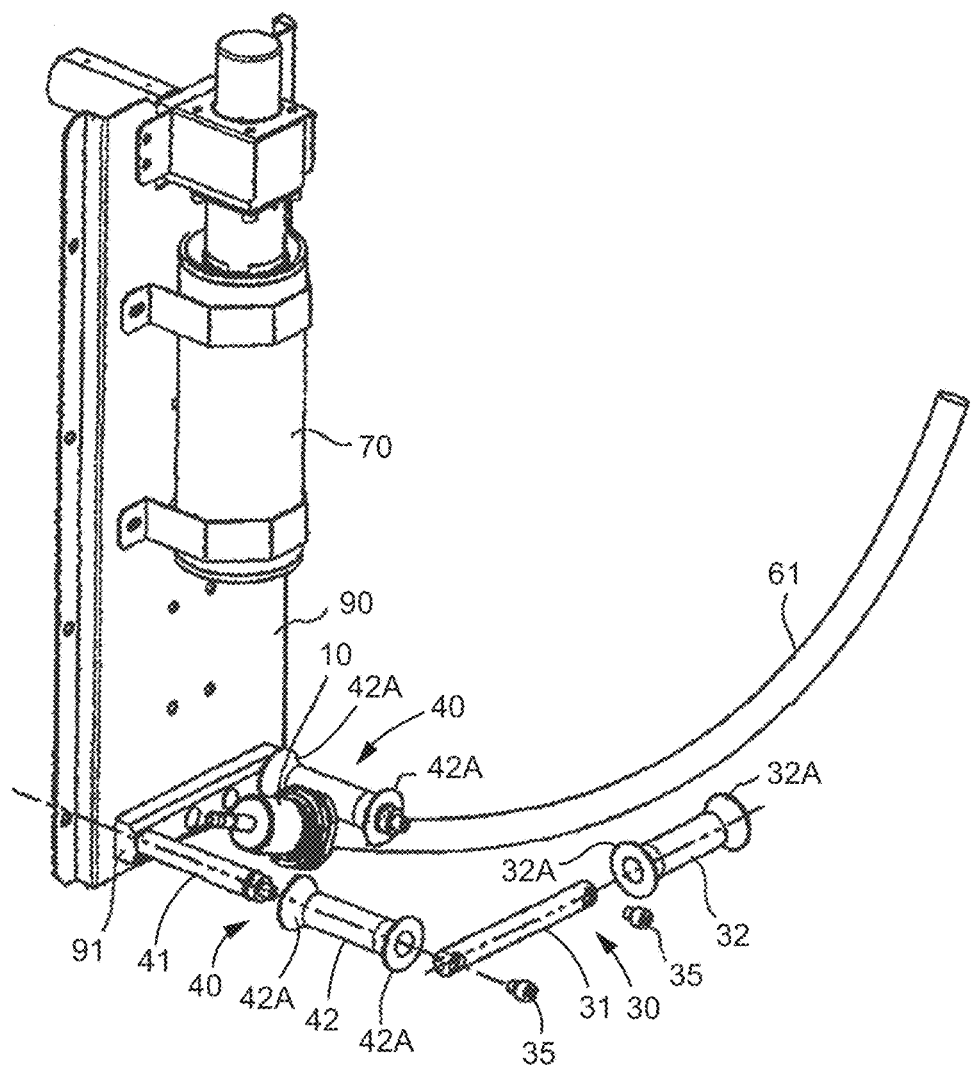
FIG. 6 is an exploded explanatory view of the roller support structure in the first embodiment.

In FIGS. 1 to 3, adjacent front roller 30 and side rollers 40 have their central shafts perpendicular to each other. If the central shaft of the front roller 30 and the central shafts of the side rollers 40 are directly connected, the central shaft of each of the rollers 30 and 40 cannot rotate, and the front roller 30 and the side rollers 40 cannot be rotated. With the roller support structure shown in FIGS. 4 to 6, both of the adjacent rollers 30 and 40 can rotate. The front roller 30 has a central shaft 31 and a hollow rotating body 32. The central shaft 31 passes through the hollow portion of the hollow rotating body 32, but the hollow rotating body 32 is not fixed (unbonded) to the central shaft 31. As a result, even if the central shaft 31 is fixed, the hollow rotating body 32 can freely rotate around the central shaft 31. Similarly, the side roller 40 also has a central shaft 41 and a hollow rotating body 42, and the central shaft 41 passes through the hollow portion of the hollow rotating body 42, but the hollow rotating body 42 is not connected (coupled) to the central shaft 41. Even if the central shaft 41 is fixed, the hollow rotating body 42 can freely rotate around the central shaft 41. In FIGS. 4 and 5, the central shaft 31 of the front roller 30 and the central shafts 41 of the side rollers 40 are represented by solid lines, and the hollow rotating body 32 of the front roller 30 and the hollow rotating bodies 42 of the side rollers 40 are represented by dashed lines. In FIG. 4, the central shaft 31 of the front roller 30 is schematically shown in half, and in FIG. 5, the central shaft 41 of one side roller 40 (lower roller 40 in FIG. 5) is also shown schematically in a half-split state. In FIG. 6, collar portions 32A and 42A are provided at both ends of the hollow rotating body 32 and the hollow rotating bodies 42 for restricting relative movement with respect to the central shafts 31 and 41. In FIGS. 4 and 5, illustration of the flange portions 32A and 42A is omitted in order to avoid complication of the drawings.

In FIGS. 4 to 6, the central shaft 31 of the front roller 30 and the central shafts 41 of the side rollers 40 are arranged to extend perpendicularly to each other. The central shafts 41 of the two side rollers 40 are connected to the ends (both ends) of the front roller 30 with fastening members 35 at the end on the front roller 30 side (the right end in FIGS. 4 to 6). In FIG. 5, ends, of the central shafts 41 of the two side rollers 40, on the side of the filling device (left end) are connected via fastening members 45 to a side roller mounting base 91 disposed on the base 90. The central shaft 31 of the front roller 30 and the central shafts 41 of the side rollers 40 are connected and both do not rotate. However, since the hollow rotating body 32 of the front roller 30 is rotatable around the central shaft 31 of the front roller 30, and the hollow rotating bodies 42 of the side rollers 40 rotate around the central shafts 41 of the side rollers 40, the hollow rotating body 32 of the front roller 30 and the hollow rotating bodies 42 of the side rollers 40 are each rotatable.

Adopting the roller support structure described in FIGS. 4 to 6 allows the hollow rotating bodies 32 and 42 of the front roller 30 and the side rollers 40 whose central axes are perpendicular to each other to rotate freely with respect to the central shafts 31 and 41, respectively. With this structure, when the socket 20 and the plug 10 of the safety joint 101 (FIG. 1) are separated, and the filling hose 61 or the plug 10 at the tip thereof contacts with the front roller 30 or the side rollers 40 placed in the opening of the casing (reference numeral 320 in FIG. 11), the hollow rotating bodies 32, 42 of the rollers 30, 40 rotate so that the filling hose 61 or the plug 10 does not engage with the hollow rotating bodies 32, 42 of the rollers 30, 40. Then, when a tensile force of the filling hose 61 acts, the filling hose 61 or the plug 10 comes out of the casing 320 (FIG. 11). It is possible consequently to prevent the filling device from being pulled by the tensile force acting on the filling hose 61 and overturning.

Figure 7:
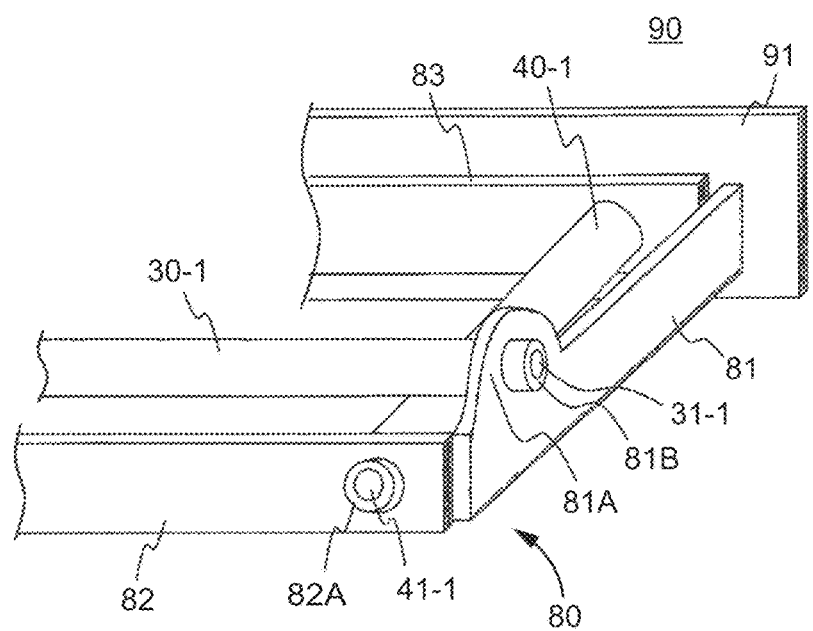
FIG. 7 is an explanatory perspective view showing the roller support structure in the second embodiment of the present invention.

The second embodiment of the present invention will now be described with reference to FIG. 7. The second embodiment shown in FIG. 7 is substantially the same as the first embodiment shown in FIGS. 1 to 6, but differs in the support structure for the central shaft (rotating shaft) of the front roller and the central shafts of the side rollers. As shown in FIG. 7, in the support structure of the second embodiment, the front roller 30-1 and the two side rollers 40-1 are supported by a mounting frame 80. FIG. 7 shows a portion of the support structure, and only one side roller 40-1 is shown. The mounting frame 80 includes a side plate 81 extending parallel to the side roller 40-1 outside the side roller 40-1 (on the right side in FIG. 7), a front plate 82 extending parallel to the front roller 30-1, and a filling device side plate 83 extending parallel to the front plate 82. Although not clearly shown, one end of the side plate 81 opposite to the front roller 30-1 is fixed on the mounting base 91 arranged on the base 90 (FIGS. 1 to 3). A filling device side plate 83 is also arranged on the mounting base 91. A side plate of the frame (not shown) extends parallel to the side roller (not shown) and is fixed to the mounting board 91. The vertical positions (vertical direction in FIG. 7) of the front roller 30-1 and the side rollers 40-1 are different. Since the front roller 30-1 and the side rollers 40-1 are not connected at their central shafts, they are independently rotatable. The positions and dimensions of the side plates 81 and the front plate 82 are set such that, when the socket 20 and the plug 10 are separated, the filling hose 61 or the plug 10 smoothly exits, due to rotations of the front roller 30-1 and the side roller 40-1, from the casing 320 (FIG. 11).

In FIG. 7, a projecting portion 81A projecting toward the front roller 30-1 is formed at an end of the side plate 81 on the front roller side. A support portion 81B for the front roller 30-1 is provided on the projecting portion 81A, and the central shafts 31-1 (rotating shaft) of the front roller 30-1 is rotatably supported by the support portion 81B. Support portions 82A for the side rollers 40-1 are provided at both ends of the front plate 82 in the longitudinal direction. Although not shown, support portions are also provided at both ends in the longitudinal direction of the filling device side plate 83. The central shafts 41-1 of the side rollers 40-1 are rotatably supported by both support portions 82A and support portions (not shown) (support portions at both ends in the longitudinal direction of the filling device side plate 83). Unlike the front roller 30 and the side rollers 40 of the first embodiment, a roller portion and the central shafts 31-1 of the front roller 30-1 are configured to be integrally rotatable, and a roller portion and the central shafts 41-1 of the side roller 40-1 are configured to be integrally rotatable.

Although not shown, it is also possible to fix the central shaft 31-1 and the central shaft 41-1 to a frame without rotating, and arrange hollow cylinders rotatable about the central shaft 31-1 and the central shaft 41-1. Other configurations and effects of the second embodiment shown in FIG. 7 are the same as those of the first embodiment shown in FIGS. 1 to 6.

Figure 8:
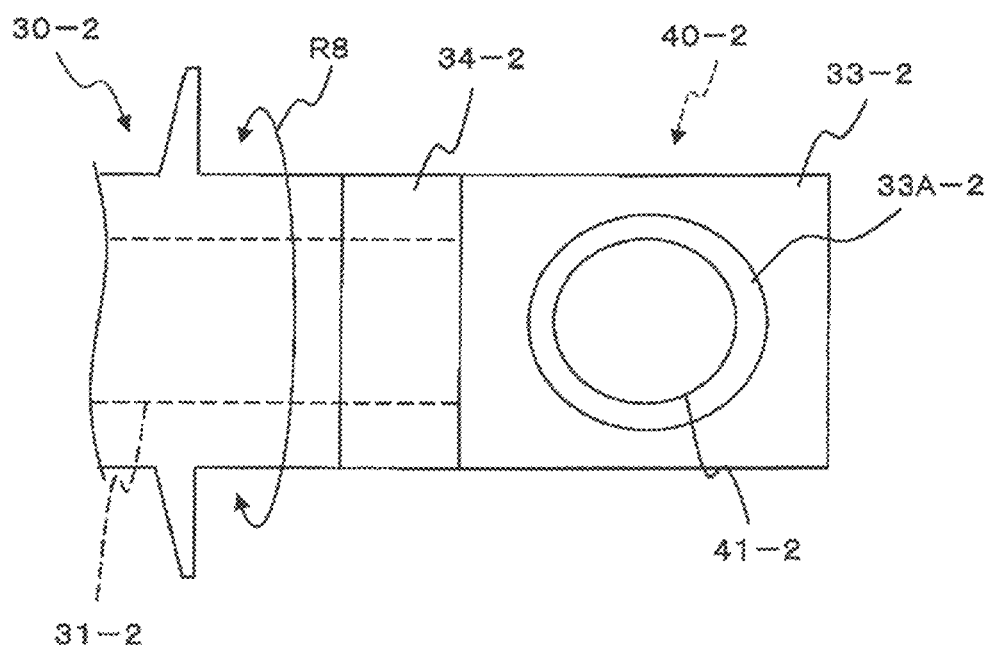
FIG. 8 is an explanatory perspective view showing the roller support structure in the third embodiment of the present invention.

The third embodiment of the present invention will now be described with reference to FIG. 8. Like the second embodiment shown in FIG. 7, the safety joint housing device according to the third embodiment is constructed in substantially the same manner as the first embodiment shown in FIGS. 1 to 6 except for the support structure. In FIG. 8, which shows an enlarged view of the portion indicated by the arrow A8 in FIG. 1, a non-rotating portion 33-2 and a center bearing 34-2 are provided at both ends of the front roller 30-2. The side roller 40-2 and its central shaft 41-2 extend in a direction perpendicular to the paper surface toward the back side of the paper surface (the side away from a viewer). The side roller 40-2 is shown with a dashed line only at its lead line. The non-rotating portion 33-2 does not rotate itself, but rotatably supports the central shaft 41-2 of the adjacent side roller 40-2 by a supporting portion 33A-2. Further, the central shaft supporting portion 34-2 rotatably (in a direction of the arrow R8) supports the central shaft 31-2 of the front roller 30-2 on which the central shaft supporting portion 34-2 is provided. The front roller 30-2 is configured to rotate integrally with the central shafts 31-2. The roller portion of the side roller 40-2 and the central shafts 41-2 are also configured to rotate integrally. The non-rotating portion 33-2 and the central shaft supporting portion 34-2 are arranged on the front roller 30-2 side. However, although not shown, it is possible to arrange the non-rotating portion and the central shaft supporting portion on the side roller 40-2 side and not on the front roller 30-2 side. Alternatively, structures similar to the non-rotating portion 33-2 and the central shaft supporting portion 34-2 can be provided not only on the front roller 30-2 but also on the side roller 40-2 side.

As described above, providing the non-rotating portion 33-2 and the center bearing portion 34-2 at both ends of the front roller 30-2 allows the central shafts 41-2 of the side roller 40-2 to be rotatably supported by the support portion 33A-2 of the non-rotating portion 33-2, and allows the central shafts 31-2 of the front roller 30-2 to be rotatably supported by the center bearing portion 34-2. In this way, the front roller 30-2 and the side rollers 40-2, which are perpendicular to each other, can be rotatably attached to the lower opening of the casing. Even if the socket 20 and the plug 10 are separated and the filling hose 61 or the plug 10 at the tip thereof comes into contact with the front roller 30-2 or the side rollers 40-2 arranged in the opening of the casing, the rollers 30-2, 40-2 rotates, so that the filling hose 61 or the plug 10 can be smoothly removed from the casing without being caught by the rollers 30-2 and 40-2. Other configurations and effects of the third embodiment are the same as those of the embodiment shown in FIGS. 1 to 7.

Figure 9:
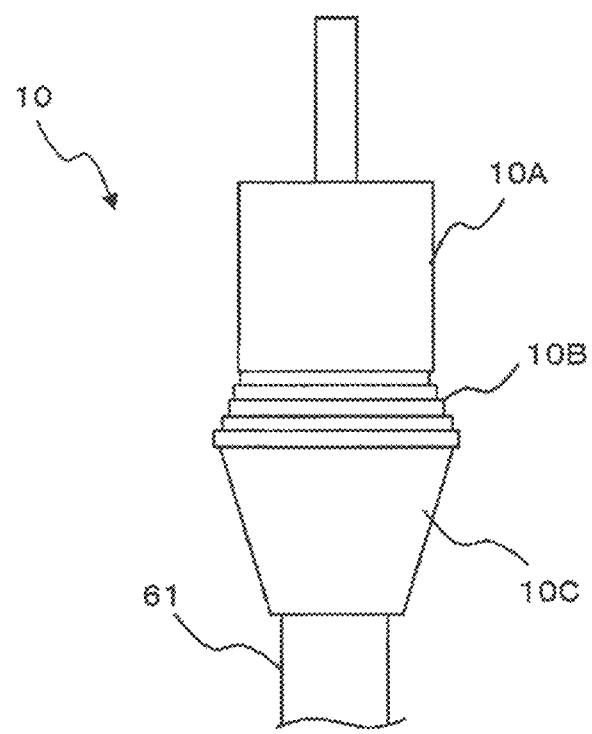
FIG. 9 is an explanatory view showing the shape of the plug in an embodiment of the present invention.

FIG. 9 shows a modification of the plug 10 of the illustrated embodiment, and the plug 10 in FIG. 9 has a body portion 10A, an intermediate portion 10B and a tapered portion 10C. The tapered portion 10C gradually decreases in diameter from the intermediate portion toward the lower end, and the filling hose 61 is connected to the lower end of the tapered portion 10C. Forming the filling hose side of the plug 10 with the tapered portion 10C eliminates a stepped portion between the plug 10 and the filling hose 61. With this, even if the socket 20 and the plug 10 are separated and the plug 10 comes into contact with the front roller and/or the side rollers 40 arranged in the opening of the casing, the tapered portion 10C smoothly contacts the rollers 30 and 40, which causes the plug 10 to be more easily pulled out of the casing.

It should be noted that the illustrated embodiments are merely examples and are not intended to limit the technical scope of the present invention.

DESCRIPTION OF THE REFERENCE NUMERALS

10 plug (vehicle side member of safety joint)
20 socket (member on filling device side of safety joint)
30-1, 30-2 front rollers
31, 31-1, 31-2 central shafts of front rollers
32 hollow rotating body of front roller
33-2 non-rotating part
34-2 central shaft supporting portion
40-1, 40-2 side rollers
41, 41-1, 41-2 central shafts of side rollers
42 hollow rotating body of side roller
61 filling hose
70 hose guide
80 mounting frame
81 side plate
81A protruding portion
82 front plate
83 filling device side plate
100 storage device for safety joint
101 safety joint
200 hydrogen filling device
320 casing
320A lower opening of casing

The invention claimed is:

1. A safety joint housing device for housing a safety joint including a plug connected to a filling hose and a socket provided in a filling device, said safety joint separating when a tensile load exceeding a predetermined level is applied, said safety joint housing device comprising:
a casing for housing the plug and the socket in a connected state;
a front roller disposed on a front side of the casing at a lower opening from which the filling hose is led out from the casing so as to be rotatable about a horizontal axis; and
two side rollers adjacent to the front roller and rotatably arranged about horizontal axes orthogonal to the axis of the front roller;
wherein the filling hose passes through the casing side of a U-shaped portion formed by the front roller and the two side rollers.

2. The safety joint housing device as claimed in claim 1, wherein a central shaft of the front roller and central shafts of the side rollers are connected; a hollow rotating body of the front roller is arranged rotatably around the central shaft without being connected thereto;
and hollow rotating bodies of the side rollers are arranged rotatably around the central shafts without being connected thereto.

3. The safety joint housing device as claimed in claim 1 further comprising a mounting frame having side plates extending parallel to the side rollers, a front plate extending parallel to the front roller, and a filling device side plate extending parallel to the front plate,
- wherein a protruding portion protruding toward the front roller is formed on an end portion, on the front roller side, of each side plate;
- a central shaft of the front roller is rotatably supported by the protruding portions of the side plates; and
- central shafts of the two side rollers are rotatably supported on both longitudinal ends of the front plate and on both longitudinal ends of the filling device side plate.

4. The safety joint housing device as claimed in claim 1, wherein a non-rotating part with a central shaft supporting portion is interposed between an end of the front roller and an end of the side roller adjacent to the front roller side; another non-rotating part with a central shaft supporting portion is interposed between the other end of the front roller and an end of the other side roller adjacent to the front roller side; the non-rotating parts rotatably support the central shafts of the rollers on which they are provided; and the central shaft supporting portions rotatably support the central shafts of the rollers on which they are provided.

* * * * *